United States Patent [19]  [11]  4,281,357
Lee  [45]  Jul. 28, 1981

[54] THIN FILM MAGNETIC HEAD AND METHOD OF MAKING THE SAME
[75] Inventor: Fred S. Lee, Oklahoma City, Okla.
[73] Assignee: Magnex Corporation, San Jose, Calif.
[21] Appl. No.: 74,246
[22] Filed: Sep. 10, 1979
[51] Int. Cl.³ .............................................. G11B 5/20
[52] U.S. Cl. ...................................... 360/125; 29/603
[58] Field of Search ............................... 360/125, 126
[56] References Cited
U.S. PATENT DOCUMENTS

| Re. 29,326 | 7/1977 | Lazzari et al. | 360/125 X |
|---|---|---|---|
| 3,639,699 | 2/1972 | Tiemann | 360/126 |
| 4,092,688 | 5/1978 | Nomura et al. | 360/126 X |
| 4,191,983 | 3/1980 | Gibson | 360/125 |
| 4,195,323 | 3/1980 | Lee | 360/126 X |

Primary Examiner—Bernard Konick
Assistant Examiner—Aristotelis M. Psitos
Attorney, Agent, or Firm—Robert M. Hessin

[57] ABSTRACT

A thin film magnetic head is disclosed which includes a substrate, a first layer of magnetic material having a first offset portion, a second layer of magnetic material having a second offset portion overlying the first offset portion, and a layer of conductor material disposed within the cavity defined by the two offset portions. In one embodiment the offset portion of the first magnetic layer is disposed within a recess in the substrate. In a second embodiment the offset portion of the first magnetic layer is disposed between two insulation layers mounted along the top surface of the substrate.

13 Claims, 4 Drawing Figures

THIN FILM MAGNETIC HEAD AND METHOD OF MAKING THE SAME

BACKGROUND OF THE INVENTION

1. Field of the Invention

This invention relates generally to magnetic devices for reading from or writing onto a magnetic storage medium and methods of fabricating the same, and more particularly, but not by way of limitation, to thin film magnetic heads which include two magnetic pole elements having offset portions and to methods of manufacturing the same.

2. Description of the Prior Art (Prior Art Statement)

The following statement is my prior art statement in compliance with the guidance and requirements of 37 C.F.R. §§ 1.56, 1.97 and 1.98.

U.S. Pat. No. 4,151,574 issued to Gerkema et al. discloses a type of magnetic head having a substrate 1 which includes a groove 2 wherein a thin film magnetic field-sensitive element 4 is formed solely on one side wall of the groove.

U.S. Pat. No. 4,092,688 issued to Nomura et al. discloses a multi-track thin film magnetic head which, as shown in FIG. 6 of the patent, proposes a sloped groove substrate which is completely filled with a non-magnetic material 31 on top of which various other layers are deposited.

U.S. Pat. No. 3,795,954 issued to Alex et al. discloses in FIG. 1 of the patent a channel-shaped ferrite piece 10 which receives deposition throughout the grooved surface. This deposition is proposed to be of non-magnetic metal layers 20 and 22 and glass layer 28. The glass layer 28 is joined to a glass layer 30 which is carried by a flat ferrite rectangular layer 12.

U.S. Pat. No. 3,672,043 and U.S. Pat. No. 3,564,521, both issued to Trimble et al., disclose a miniature magnetic head. FIG. 2 of each of these patents discloses a substrate 25 having recesses 25a, 25b, and 25c wherein a thin layer 35 of high permeability magnetic material is deposited.

As shown by the preceding references, there is a need for thin film magnetic heads. This need exists because thin film heads reduce the physical size of magnetic recording and playback apparatus and permit better utilization of the available storage area of a recording medium.

In addition to the basic need for thin film magnetic heads, there is the need for such heads to have a structure which reduces cracking and other fabrication defects in the layers of materials applied to the substrate. In particular, as is shown in the cited references and is generally known in the art, in the batch fabrication of thin film magnetic heads the front and back gap regions of the magnetic films have had steep slopes due to the necessary build-up of the intermediate layers on top of the flat surface of the substrate. These slopes have presented a severe coverage problem for, in particular, the top pole magnetic film. This is particularly troublesome when the top pole magnetic film is put on by a vacuum technique such as sputtering or evaporation because the magnetic film tends to crack due to the steepness of the slope along which the layer extends. This cracking reduces the quality or precludes the use of such defective heads and thus creates a need for a type of thin film magnetic head and method of making the same which improves the quality by reducing or eliminating the cracking problem.

Still another need is to provide a thin film magnetic head having pole elements which are symmetrically placed around the conductor elements of the head. As the cited references indicate and as is generally known in the art, present heads are asymmetrical because they are constructed with various layers built on a flat surface of the substrate. Such asymmetry creates a structure having operating qualities which are inferior to those of a symmetrical structure. Thus, the need arises for a symmetrical head having improved operating characteristics.

Because of these shortcomings of the cited references, it is believed that the cited references fail to meet these needs.

SUMMARY OF THE INVENTION

The present invention overcomes the above-noted and other shortcomings of the prior art by providing a novel, useful and improved thin film magnetic head. This thin film magnetic head includes a substrate which provides an offset region with which magnetic poles having offset portions are associated. This offset structure permits better coverage by the films over slopes which are less deep than those existing in previous types of heads. This simplifies fabrication and improve magnetic film quality. Furthermore, the offset portion provides a symmetrical enclosure to the conductors thereby enhancing the operation of the present invention.

More particularly, the thin film magentic head of the present invention comprises a substrate, a first layer of magnetic film a second layer of magentic film and a layer or multiple layers of electrically conductive material. The substrate includes a top surface having an offset region which is associated with the first layer of magentic film.

The first layer of magnetic film includes a first front gap portion, a first back gap portion, and a first offset portion which extends between the first front gap and the first back gap. This first offset portion defines a first sloping surface which is disposed in angular relationship to the top surface of the substrate.

The second layer of magentic film includes a second front gap portion, a second back gap portion, and a second offset portion. The second front gap portion is disposed in aligned spaced relation to the first front gap portion of the first layer of magnetic film. The second back gap portion is disposed adjacent the first back gap portion of the first layer of magentic film. The second offset portion defines a second sloping surface which is disposed in angular relationship to the top surface and is also disposed in spaced relation to the first sloping surface so that a cavity is defined between these two sloping surfaces.

The layer and/or layers of electrically conducting material is disposed within the cavity formed between the first and second sloping surfaces of the first and second layers of magnetic film.

As more fully described below, this thin film magnetic head of the present invention reduces the depth over which the layers of magnetic film must be placed so that the cracking problem heretofore known in the art is overcome. This is overcome through the design of the offset portions of the first and second layers of magnetic film. Furthermore, these offset portions may be dimensioned so that the cavity formed therebetween is substantially symmetrical to enhance the operating characteristics of the magnetic head.

In addition to the inventive structure, the present invention includes a method of making such a thin film magnetic head. This method generally comprises the steps of selecting a substrate having a top surface, creating an offset region associated with this top surface, applying a first layer of magnetic film along the contour of the offset region, constructing a layer or layers of electrically conducting material adjacent the first layer of magnetic film within the offset region, and applying a second layer of magnetic film in overlying relation to the first layer of magnetic film and to the layer of electrically conducting material. This second layer may also be applied in substantially symmetrical relation to the first layer of magnetic film and to the electrically conducting material. Furthermore, the step of creating an offset region may include the step of forming a recess which extends from the top surface into the substrate. A second preferred method of creating an offset region may include the step of forming first and second insulation layers on the top surface in spaced relation to each other.

From the foregoing, it is a general object of the present invention to provide a novel, useful and improved thin film magnetic head. Other and further objects, features and advantages of the present invention will be readily apparent to those skilled in the art upon a reading of the description of the preferred embodiments which follows, when taken in conjunction with the accompanying drawings.

DETAILED DESCRIPTION OF THE PREFERRED EMBODIMENTS OF THE INVENTION

Figure 1:
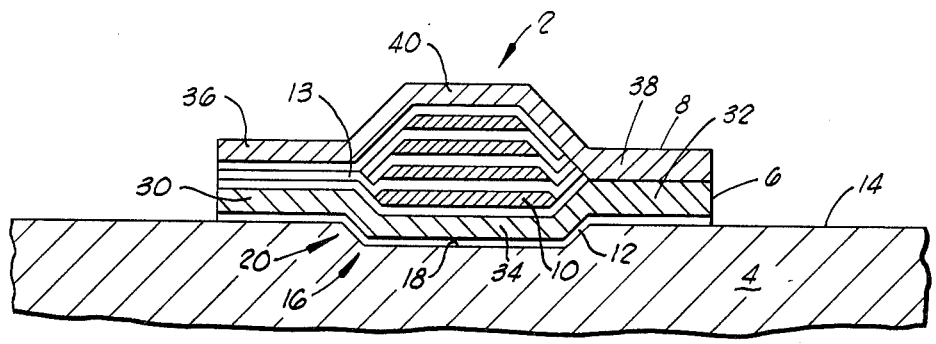
FIG. 1 is a sectional side elevation view of a first preferred embodiment of the present invention.
Figure 2:
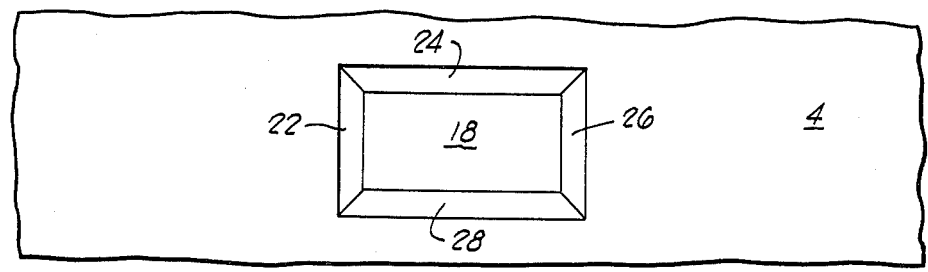
FIG. 2 is a top plan view of the substrate of the first preferred embodiment of the present invention.

Referring now to the drawings and in particular to FIGS. 1 and 2, a first preferred embodiment of the present invention will be described. A thin film magnetic head 2, which is, generally, a magnetic device for reading from or writing onto a magnetic storage medium, is shown to include a substrate 4, a first layer 6 of magnetic film, a second layer 8 of magnetic film and one or more layers 10 of electrically conductive material. The thin film head 2 may also include layers 12 and 13 of insulation for separating the substrate 4 from the first magnetic layer 6 and for separating the magnetic layers 6 and 8 and the conductor layers 10, respectively.

The substrate 4, which may be made of silicon, photoceram, ceramic, ferrite or any other material suitable as a thin film subcarrier, includes a top surface 14. FIG. 1 shows that the substrate 4 includes an offset region shown as a recess 16 which is defined by a bottom surface 18 and a side surface 20. The recess 16 may be etched into the substrate by means of any well-known etching technique or it may be formed by any other suitable technique. FIG. 1 further shows that the preferred embodiment bottom surface 18 lies in parallel spaced relation to the top surface 14. FIG. 2 more particularly discloses that the bottom surface 18 has a rectangular shape. FIG. 2 also shows that the side surface 20 includes four rectangularly-associated beveled surfaces 22, 24, 26 and 28. That is, these surfaces extend at a non-perpendicular angle between the top surface 14 and the bottom surface 18 and are connected to define a rectangular perimeter around the recess 16. In the preferred embodiment these side elements extend from the top surface 14 to the bottom surface 18 to define the contour of recess 16 as a frustum of a pyramid.

FIG. 1 next shows that in the first preferred embodiment, the layer 12 of insulation, such as a layer of $SiO_2$, is deposited along the top surface of the substrate and the contour of the recess. This layer serves as a smoothing layer on which the first layer 6 of magnetic film is deposited.

FIG. 1 further shows that the first layer 6 of magnetic film, which provides the bottom thin film magnetic pole of the thin film head 2 and which may be made of NiFe or any other suitable material, includes a first front gap portion 30, a first back gap portion 32 and a first offset portion 34. The front gap portion 30 is associated with the top surface 14, as is the first back gap portion 32. The first offset portion 34 is shown disposed within the recess 16. This offset portion 34 follows the contour of the recess 16 so that the offset portion 34 defines a sloping surface which is disposed in angular relation to the top surface 14.

Still further, FIG. 1 shows that the second layer 8 of magnetic film, which provides the top thin film magnetic pole of the thin film head and which may be made of the same material as the first magnetic layer 6, includes a second front gap portion 36, a second back gap portion 38 and a second offset portion 40. The second front gap portion 36 is shown disposed in aligned spaced relation to the first front gap portion 30. This spaced relationship provides the gap region necessary for reading from or writing onto a recording medium as is known in the art. As shown in FIG. 1, this gap may be filled with a number of layers 13 of insulation. The second back gap region 38 is shown disposed adjacent the first back gap region 32. This adjacent connection permits coupling of the magnetic circuits provided by the magnetic layers 6 and 8. The second offset portion 40 is shown disposed above the recess 16 and defines a second sloping surface extending in angular relation to the top surface and in spaced relation to the first sloping surface of the first offset portion 34. The disposition of the second offset portion in spaced relation to the first sloping surface of the first offset portion 34 defines a cavity therebetween in which the electrically conducting material 10 is disposed. By dimensioning the first and second offset portions appropriately, the cavity can be made substantially symmetrical thereby enhancing the operating characteristics of the head 2.

FIG. 1 further discloses a plurality of layers 10 of conductive material each separated by one of the layers 13 of insulation material. Such insulation layers may be made of $SiO_2$, SiO, $Al_2O_3$, $Si_3N_4$, or any other suitable material. The layers 10 of conductive material may be made of any suitable material and are connected to the ordinary circuitry used with thin film magnetic heads as is known in the art.

Figure 3:
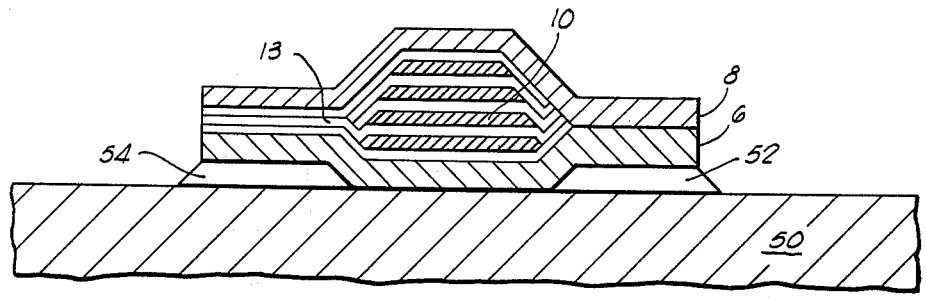
FIG. 3 is a sectional side elevation view of a second preferred embodiment of the present invention.
Figure 4:
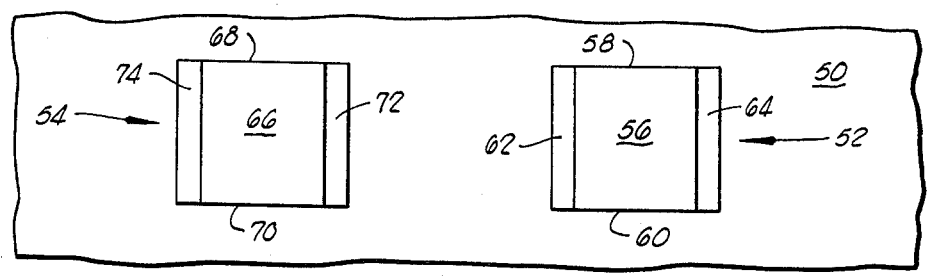
FIG. 4 is a top plan view of the substrate and insulation layer of the second preferred embodiment of the present invention.

With reference now to FIGS. 3 and 4, a second preferred embodiment of the present invention will be described. FIG. 3 discloses that this second embodiment includes a substrate 50, a first insulation layer 52 and a second insulation layer 54 in combination with layers of magnetic film and electrically conductive material such as the first and second magnetic film layers 6 and 8 and the conductor material 10, whose layers are separated by the insulation layers 13.

The substrate 50 is identical to the substrate 4 in its composition and in its having a top surface. However, the substrate 50 does not have a recess 16. Instead of the recess 16, the substrate has the first insulation layer 52 disposed on a first area of its top surface and has the second insulation layer 54 disposed on a second area of its top surface.

The first insulation layer 52 is shown in FIG. 4 to include a first upper surface 56, a first side surface 58 extending from the first upper surface 56 to the top surface of the substrate 50, a second side surface 60 extending from the first upper surface 56 to the top surface of the substrate 50 in spaced relation to the first side surface 58, a first inner surface 62 extending from the first upper surface 56 to the top surface of the substrate 50 between the first and second side surfaces, and a first outer surface 64 extending from the first upper surface 56 to the top surface of the substrate 50 in spaced relation to the first inner surface 62 and between the side surfaces 58 and 60. In the preferred embodiment shown in FIG. 4, the upper surface 56 is rectangular and disposed parallel to the top surface of the substrate 50 while the side surfaces 58 and 60 extend perpendicularly to the top surface and the inner and outer surfaces 62 and 64 extend non-perpendicularly from the top surface. Such preferred embodiment sides define the insulation layer to have a shape of a prismoid having rectangular upper and lower bases. Such a shape is obtained by depositing insulation material to a desired thickness along the top surface of the substrate 50 and then using a a chemical etching or other suitable etching technique to construct the shape.

The second insulation layer 54 is constructed similarly to the first insulation layer 52. FIG. 4 shows that this construction includes a second upper surface 66, a third side surface 68 extending from the second upper surface 66 to the top surface of the substrate 50, a fourth side surface 70 extending from the second upper surface 66 to the top surface of the substrate 50 in spaced relation to the third side surface 68, a second inner surface 72 extending from the second upper surface 66 to the top surface of the substrate 50 between the third and fourth side surfaces 68 and 70, and a second outer surface 74 extending from the second upper surface 66 to the top surface of the substrate 50 between the third and fourth side surfaces and in spaced relation to the second inner surface 72. As with the first insulation layer 52, the elements of the second insulation layer 54 are disposed in the preferred embodiment to define the shape of a prismoid having rectangular upper and lower bases. The second insulation layer 54 is likewise preferably constructed in the same manner as the first insulation layer 52.

With respect to the spatial relationship between the first insulation layer 52 and the second insulation layer 54, FIG. 4 shows that the inner surface 72 is disposed in facing spaced relation to the first inner surface 62. Furthermore, FIG. 4 shows that the first side surface 58 and the third side surface 68 are aligned to lie in substantially the same plane. FIG. 4 also shows that the second side surface 60 and the fourth side surface 70 similarly are aligned to lie in substantially the same plane, which plane is spaced parallel to the plane of the first and third side surfaces 58 and 68. This spatial relationsip thus defines an offset region associated with the substrate 50.

With the insulation layers 52 and 54 constructed in the manner as just described, it is shown in FIG. 3 that the first magnetic layer 6 has its offset portion disposed between the two insulation layers so that the offset portion follows the contour defined by the facing inner surfaces 62 and 72.

From this description of the two preferred embodiments of the present invention, it is apparent that the shortcomings of the prior art are overcome and the previously stated needs are met. The problem of cracking is overcome because the recess 16 or the insulation layers 52 and 54 provide a less deep slope along which the two magnetic layers 6 and 8 are constructed. Furthermore, by providing an offset portion in both of the magnetic layers 6 and 8, a symmetrical cavity may be obtained to enhance the functioning of the head.

Thus, the present invention of a thin film magnetic head is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A thin film magnetic head comprising:
    a substrate having a top surface;
    a first layer of magnetic film having a first front gap portion, a first back gap portion, and a first offset portion extending between said first front gap and said first back gap, said first offset portion defining a first sloping surface disposed in angular relationship to said top surface;
    a second layer of magnetic film having a second front gap portion disposed in aligned spaced relation to said first front gap portion, a second back gap portion disposed adjacent said first back gap portion, and a second offset portion, said second offset portion defining a second sloping surface disposed in angular relationship to said top surface and in spaced relation to said first sloping surface so that a cavity is defined between said first and second sloping surfaces; and
    a layer of electrically conductive material disposed within said cavity.

2. A thin film magnetic head as recited in claim 1 wherein:
    said substrate includes a recess extending into said substrate from said top surface, said recess defined by a bottom surface and a side surface extending from said bottom surface to said top surface;
    said first offset portion is disposed within said recess; and
    said second offset portion is disposed above said recess.

3. A thin film magnetic head as recited in claim 2 wherein:
    said bottom surface of said recess has a rectangular shape and is disposed in parallel spaced relation to said top surface; and
    said side surface of said recess includes four rectangularly-associated beveled surfaces.

4. A thin film magnetic head as recited in claim 1 further comprising:

a first insulation layer attached to a first area of said top surface of said substrate; and a second insulation layer attached to a second area of said top surface of said substrate in spaced relation to said first insulation layer.

5. A thin film magnetic head as recited in claim 4 wherein said first offset portion is disposed between said first and second insulation layers.

6. A thin film magnetic head as recited in claim 5 wherein:

said first insulation layer includes: a first upper surface;
  a first side surface extending from said first upper surface to said top surface of said substrate;
  a second side surface extending from said first upper surface to said top surface in spaced relation to said first side surface;
  a first inner surface extending from said first upper surface to said top surface between said first and second side surfaces; and
  a first outer surface extending from said first upper surface to said top surface in spaced relation to said first inner surface and between said first and second side surfaces; and said second insulation layer includes:
  a second upper surface;
  a third side surface extending from said second upper surface to said top surface;
  a fourth side surface extending from said second upper surface to said top surface in spaced relation to said third side surface;
  a second inner surface extending from said second upper surface to said top surface between said third and fourth side surfaces and in facing spaced relation to said first inner surface; and
  a second outer surface extending from said second upper surface to said top surface between said third and fourth side surfaces and in spaced relation to said second inner surface.

7. A thin film magnetic head as recited in claim 6 wherein:

said first upper surface, said first and second side surfaces and said first inner and outer surfaces define said first insulation layer to have a shape of a prismoid having rectangular upper and lower bases; and said second upper surface, said second and third side surfaces and said second inner and outer surfaces define said second insulation layer to have a shape of a prismoid having rectangular upper and lower bases.

8. A magnetic device for reading from or writing onto a magnetic storage medium comprising:

a substrate having a top surface;

a bottom thin film magnetic pole associated with said top surface, said bottom pole having a first front gap portion, a first back gap portion and a first offset portion extending between and in a different plane than said first front and back gap portions;

a conductor disposed within said first offset portion; and a top thin film magnetic pole having a second front gap portion, a second back gap portion and a second offset portion extending between said second front and back gap portions, said top pole disposed in overlying relation to said bottom pole so that said conductor lies within a substantially symmetrical cavity defined by said first and second offset portions.

9. A magnetic device as recited in claim 8 wherein:

said substrate includes a recess extending into said substrate from said top surface, said recess defined by a bottom surface and a closed side surface extending from said bottom surface to said top surface;

said first offset portion is disposed within said recess; and said second offset portion is disposed above said recess.

10. A magnetic device as recited in claim 9 wherein said bottom surface and said closed side surfaces include elements defining said recess in the shape of a frustum of a pyramid.

11. A magnetic device as recited in claim 8 further comprising:

a first insulation layer attached to a first area of said top surface of said substrate; and a second insulation layer attached to a second area of said top surface of said substrate in spaced relation to said first insulation layer.

12. A magnetic device as recited in claim 11 wherein said first offset portion is disposed between said first and second insulation layers.

13. A magnetic device as recited in claim 12 wherein said first and second insulation layers respectively include elements defining the shapes of said insulation layers to be prismoids having rectangular upper and lower bases.

* * * * *